(12) United States Patent
Kappich et al.

(10) Patent No.: US 7,597,173 B2
(45) Date of Patent: Oct. 6, 2009

(54) DEVICE FOR COUPLED ATTACHMENT OF AN EXHAUST SYSTEM TO AN INTERNAL COMBUSTION ENGINE

(75) Inventors: Joachim Kappich, Bad Liebenzell (DE); Michael Wessels, Bietigheim-Bissingen (DE); Rouven Voehringer, Renningen (DE)

(73) Assignee: Dr. Ing. H.C.F. Porsche AG, Stuttgart (DE)

( * ) Notice: Subject to any disclaimer, the term of this patent is extended or adjusted under 35 U.S.C. 154(b) by 613 days.

(21) Appl. No.: 11/490,028

(22) Filed: Jul. 21, 2006

(65) Prior Publication Data
US 2007/0045033 A1    Mar. 1, 2007

(30) Foreign Application Priority Data
Jul. 22, 2005    (DE) ................ 10 2005 034 261

(51) Int. Cl.
*B60K 13/04* (2006.01)
(52) U.S. Cl. ................ 180/309; 180/89.2; 180/296
(58) Field of Classification Search ............. 180/89.2, 180/225, 296, 309; 181/212, 227, 228, 264
See application file for complete search history.

(56) References Cited

U.S. PATENT DOCUMENTS

| | | | | |
|---|---|---|---|---|
| 2,022,982 | A * | 12/1935 | Sikorsky | 60/323 |
| 4,494,722 | A * | 1/1985 | Kanai et al. | 248/621 |
| 4,796,841 | A * | 1/1989 | Baker et al. | 248/60 |
| 6,591,935 | B1 | 7/2003 | Petley | |
| 6,622,975 | B2 * | 9/2003 | Steinmaier | 248/60 |
| 6,758,300 | B2 * | 7/2004 | Kromis et al. | 180/309 |
| 6,981,567 | B2 * | 1/2006 | Stodolka | 180/309 |
| 2004/0060763 | A1 * | 4/2004 | Stodolka | 180/309 |

FOREIGN PATENT DOCUMENTS

DE    86 33 380 U1    6/1987
DE    40 32 431 C1    4/1992

OTHER PUBLICATIONS

European Search Report dated Sep. 27, 2006, including partial English translation of the relevant portion (three (3) pages).

* cited by examiner

*Primary Examiner*—Christopher P Ellis
*Assistant Examiner*—Vaughn T Coolman

(57) ABSTRACT

A vibration adjustment of a drive assembly is achieved by way of a pivoted mount about a longitudinal vehicle axis of an articulated column. An exhaust system with exhaust mufflers and catalytic converters is used to shift a total powertrain vibration to a lower engine speed, and a significantly improved vibrational behavior can be achieved at idle speed.

20 Claims, 3 Drawing Sheets

DEVICE FOR COUPLED ATTACHMENT OF AN EXHAUST SYSTEM TO AN INTERNAL COMBUSTION ENGINE

This application claims the priority of German application 10 2005 034 261.2, filed Jul. 22, 2005, the disclosure of which is expressly incorporated by reference herein.

BACKGROUND AND SUMMARY OF THE INVENTION

This invention relates to a device for the coupled attachment of an exhaust system to an internal combustion engine or a drive assembly for improving the vibrational behavior at idle speed in which the exhaust system has an exhaust pipe system connected at each cylinder side of the motor with a catalytic converter and an upstream exhaust muffler.

One problem with internal combustion engines running in idle is vibrations developing in the drive assembly. These vibrations result in vibrations of the whole powertrain at critical engine speeds, and have an unfavorable effect on the vibrational behavior of the drive assembly at idle speed.

One object of the invention is the object of creating a device for a drive assembly, or for an internal combustion engine, which shifts the total yaw vibrations from a critical engine speed range to a non-critical low engine speed range.

This object is achieved according to the invention by providing an articulated column held in a transverse plane of the vehicle coupled with a front side of the internal combustion engine about a horizontally arranged swiveling axis aligned in a longitudinal vehicle direction. The articulated column includes, at opposite diverging brackets, mutually spaced holding devices for exhaust pipes of the exhaust system. Each of the holding devices is arranged in an exhaust pipe system between the exhaust muffler and the catalytic converter, and the exhaust muffler is connected with the internal combustion engine by way of at least one holding device. Further advantageous characteristics are apparent from dependent claims.

Through the invention, vibration adjustment of the drive assembly occurs such that the total powertrain yaw vibrations are shifted to a lower engine speed, and thus an enhanced vibrational behavior at idle speed of the drive assembly or the internal combustion engine is achieved. To achieve this, with one front side of the drive assembly or the internal combustion engine, an articulated column, held in a transverse plane of the vehicle, is coupled around a horizontally arranged swiveling axis, which is aligned in the longitudinal direction of the vehicle. At opposing divergent brackets, the articulated column exhibits holding devices, which are arranged at a distance from each other, for exhaust pipes of the exhaust system, which are each disposed in an exhaust pipe system between an exhaust muffler and the catalytic converter. The exhaust mufflers are connected with the internal combustion engine via at least one retainer with the internal combustion engine. According to the invention, the articulated column consists of a triangle-shaped support element. At free ends of the brackets, the support element has clamps or holding devices for the exhaust pipes, and in the upper area where the two supporting arms meet, a support for the horizontal swiveling axis of the articulated column is arranged at the supporting element. It is possible in this way to provide the device in a fixed connection with the drive assembly and therefore also to carry out the vibrational movements at idle speed. However, the device also is decoupled from the drive assembly, around the swiveling axis aligned horizontally and in the longitudinal direction to the powertrain, so that the device may perform movements with the exhaust mufflers and the catalytic converter directed against the movements of the drive assembly.

According to the invention, moreover, the articulated column is seated on a load bearing structure that is connected with a transverse carrier bracing of the internal combustion engine, which is supported at the vehicle structure. The holding devices for the exhaust pipes are furthermore arranged coaxially to each other according to the invention, and are at a distance in front of the articulated column. A damping effect at idle speed can be achieved by way of the fixed attachment of the exhaust pipes to the articulated column, their movement about the horizontal carrier axis, the fixed connection with the drive assembly, and the constrained movement of the exhaust pipe system, and therefore the exhaust mufflers connected thereto, as well as of the catalytic converters, which may counteract the vibrational movements of the drive assembly at idle speed with their weight and reduce the yaw mode.

Each of the exhaust pipes of the exhaust pipe system is firmly encompassed by at least one holding device of the articulated column and enters into it in a lower area of the pan of an exhaust muffler. The exhaust mufflers extend from the entry area of the exhaust pipes vertically upwards, and the center of gravity of each exhaust muffler is arranged above the holding device or devices. This particular exhaust muffler arrangement supports damping, or effects of the invention on the vibrations, at idle speed.

The internal combustion engine or the drive assembly as a whole is seated in its mounts such that it can oscillate about a vertical axis, and the articulated column oscillates against the oscillating motion of the drive assembly or the internal combustion engine about the horizontal mount axis. The exhaust mufflers counteract the oscillating motion of the drive assembly or the motor around the vertical axis at idle speed. In particular, the articulated column is coupled with the drive assembly, or the motor, and pivoted to it about the horizontal mount axis in a decoupled state. The column is simultaneously pivoted about the vertical axis in such a way that the exhaust pipes of the two exhaust pipe systems connected with the articulated column via the holding devices are opposite a movement acting on the two exhaust mufflers as well as on the catalytic converters against the oscillating motions of the drive assembly or the motor at idle speed. The fact that the two catalytic converters are connected with each other via the articulated column and pivotably at the motor or the drive assembly results in a low rigidity in vertical direction of the catalytic converters due to the pivoted arrangement, and therefore the end mufflers oscillate against the drive assembly at idle speed. Power is transmitted in the transverse direction in this way onto the drive assembly via the pivoted attachment of the articulated column.

An embodiment of the invention is shown in the drawings, and is described in more detail below.

DETAILED DESCRIPTION OF THE INVENTION

Figure 1:
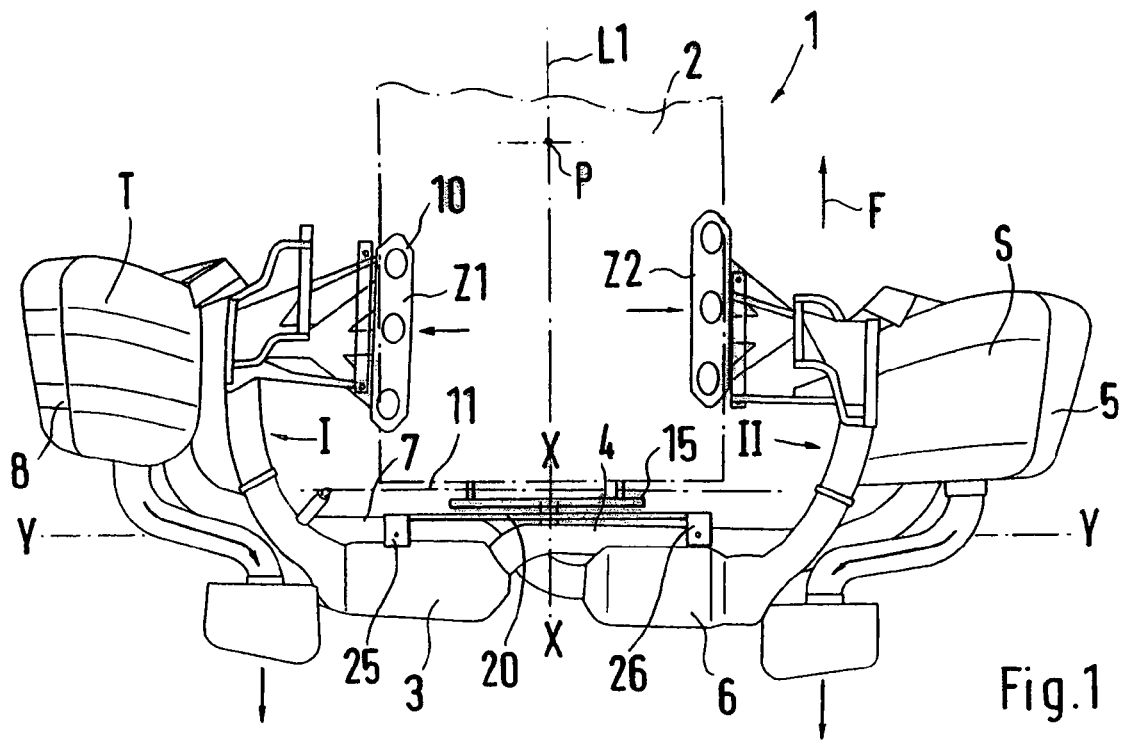
FIG. 1 is a view of an exhaust system with exhaust mufflers, catalytic converters, and the attachment device, with an articulated column.
Figure 2:
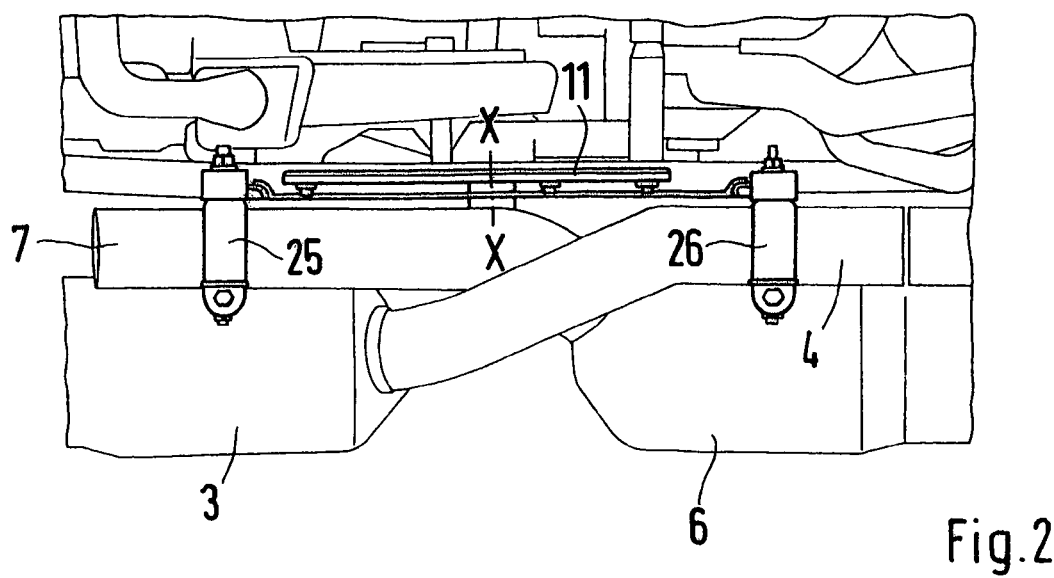
FIG. 2 is an enlarged view of the exhaust pipes of the two exhaust pipe systems held by the articulated column.
Figure 3:
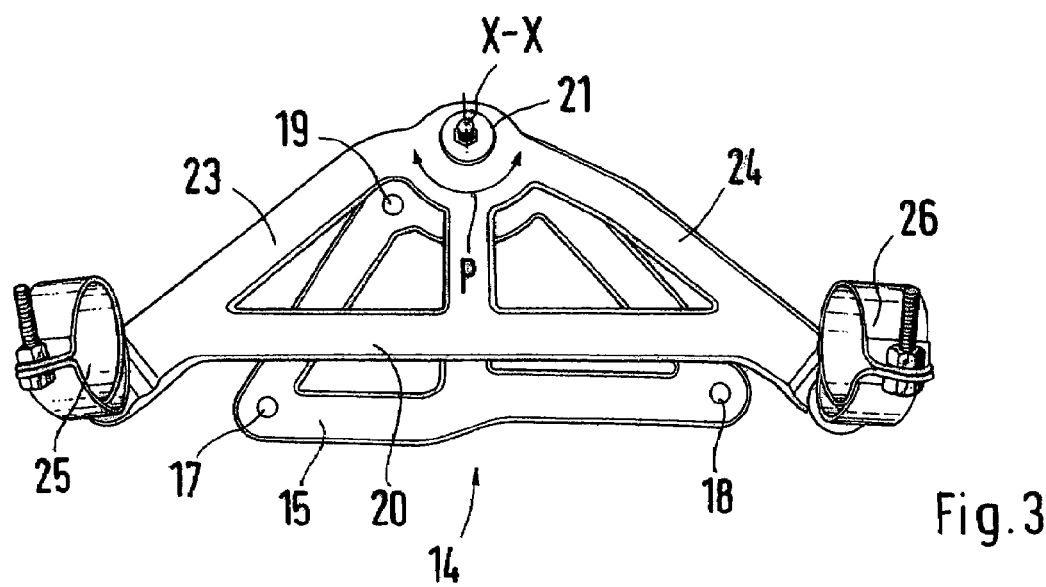
FIG. 3 is a view of a device consisting of an articulated column arranged pivotably to a load bearing structure.
Figure 4:
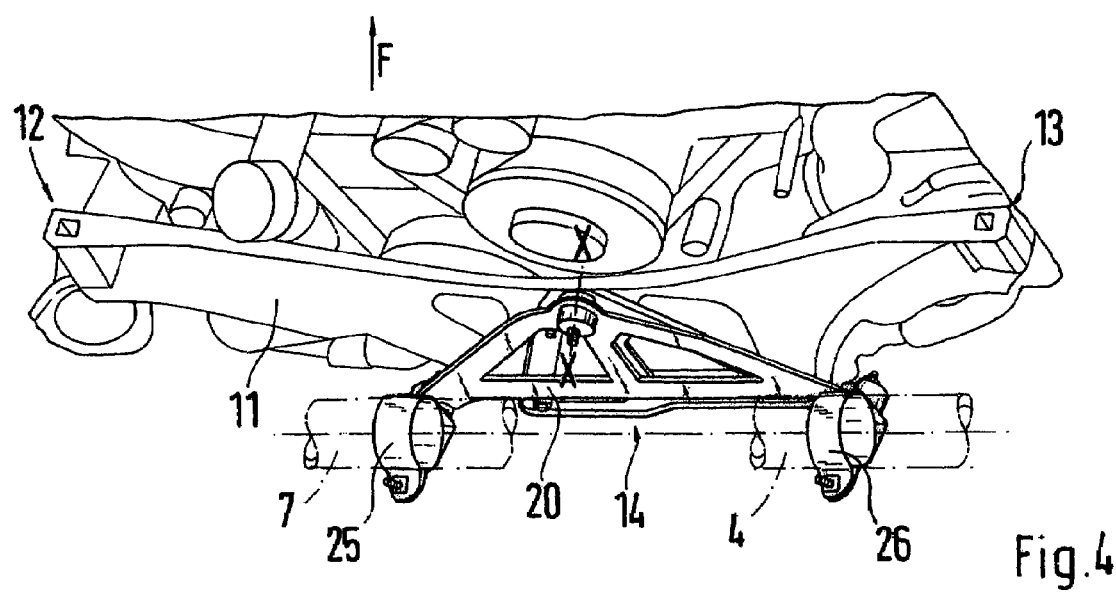
FIG. 4 is a diagram of the device held by the motor or a carrier bracing the motor.

As can be seen from FIGS. 1 and 2, the exhaust system 1 for a motor vehicle comprises two exhaust pipe systems I and II. The first exhaust pipe system I runs from one cylinder side Z1 of the motor 2 via a catalytic converter 3 and an exhaust pipe 4 into an exhaust muffler 5, and from there the exhaust flow is discharged to the outside. The second exhaust pipe system II is implemented accordingly and runs from the additional cylinder side Z2 to the catalytic converter 6 and via the exhaust pipe 7 to the additional exhaust muffler 8, and from there the exhaust air flow is also discharged to the outside. The exhaust mufflers 5, 8 are aligned sideways to the motor or the drive assembly 2, which may also comprise a transmission (not shown), and are attached at the motor 2 by means of holding device 10. The holding devices 10 are arranged at the lower end of the exhaust muffler 5, 8, and they extend from the holding devices 10 upwards. The exhaust pipes 4, 7 run into the lower area of the pan T of the exhaust mufflers 5, 8. The drive assembly 2 or the motor is connected with the vehicle construction via several mounts. The mount in the back— seen relative to the driving direction F of the vehicle—is achieved by means of a carrier bracing 11 (FIG. 4), which is supported at the end side at 12 and 13 on the vehicle structure. The motor 2 is connected to this carrier bracing 11 on the front side, which can be seen in FIG. 4.

A device 14 for the coupled attachment of the exhaust system 1 is held at the carrier bracing which is implemented as set forth above. This device 14 essentially comprises a load bearing structure 15, which is connected with the carrier bracing 11, and which is in a fixed connection with the carrier bracing 11 via attachment devices such as at 17, 18, and 19. At the load bearing structure 15, an articulated column 20 is held on a mount 21 in such a way that the articulated column 20 may perform a swiveling motion about a horizontal axis X-X, which runs in longitudinal direction L1 of the vehicle as is shown in more detail in FIGS. 1 to 4.

The articulated column 20 consists of a triangle-shaped flat load bearing structure with diverging brackets 23, 24. At its free end, each bracket comprises a clamp or a holding device 25, 26. The exhaust pipes 4, 7 are attached in the clamps or holding devices. Thus, on one hand, the device 14 with the drive assembly 2 or the motor is firmly dependent in its movement on the motor movement about a vertical axis P at idle speed (FIG. 2) and, on the other hand, the articulated column 20 may perform its own movement about the horizontal swiveling axis X-X. This means that during a swiveling motion of the motor 2 about the vertical axis P, i.e. about an approximately vertically aligned axis, the articulated column 20 will become slightly distorted in the longitudinal direction of the motor 2, and perform excursion movements in transverse the direction of the motor, as shown in FIG. 7.

Figure 7:
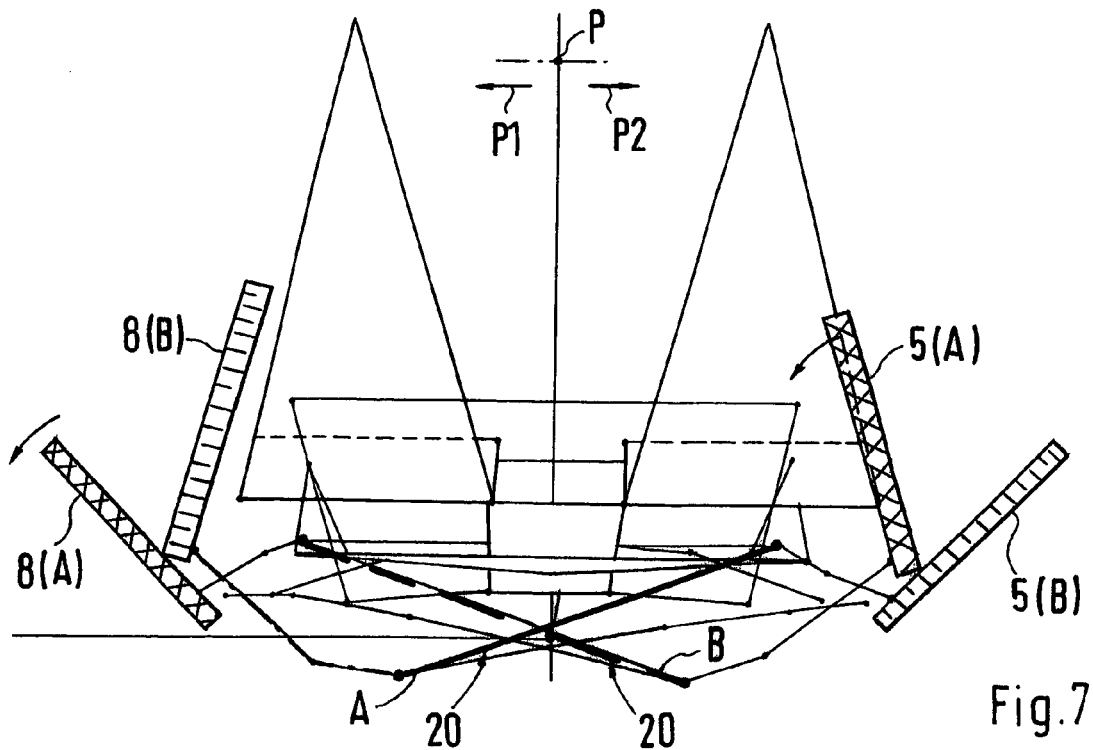
FIG. 7 is an illustration of a simulation of the movement of the articulated column due to the oscillating motion of the motor or the drive assembly with the sequence of the motion of the two exhaust mufflers.

Such movements of the articulated column 20 are shown schematically in FIG. 7 as a simulation image. In an oscillating motion of the motor 2 about the vertical axis P in the arrow direction P1, the articulated column 20 establishes itself in position A, and the exhaust mufflers 8(A) and 5(A) effect a counteracting force to the motor 2. Correspondingly, an oscillating motion of the motor 2 in the arrow direction P2 causes the articulated column 20 to take up position B, and the exhaust mufflers 5(B) and 8(B) position themselves against the oscillating motion of the motor 2. By way of the fixed connection of the articulated columns 20 with the exhaust pipes 4, 7, the catalytic converters 3, 6 also act as a counter mass or counter masses to the motor 2.

Figure 5:
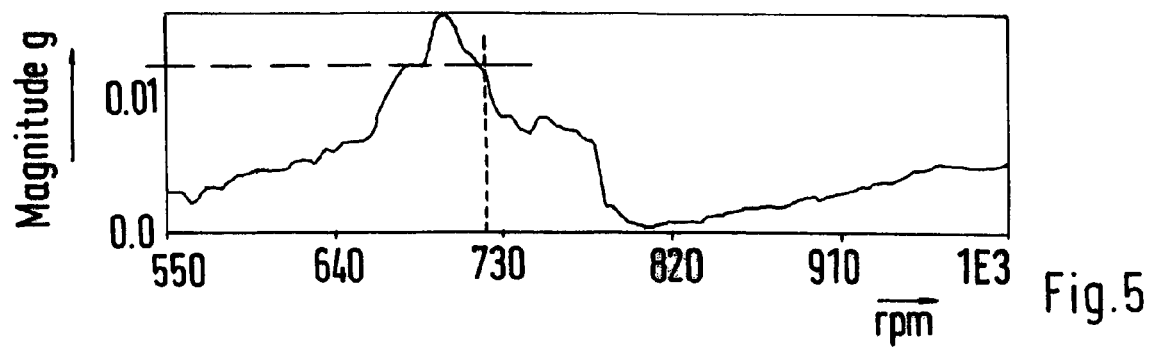
FIGS. 5 and 6 are diagrams showing original and lowered vibrations at the same idle speed of the motor.
Figure 6:
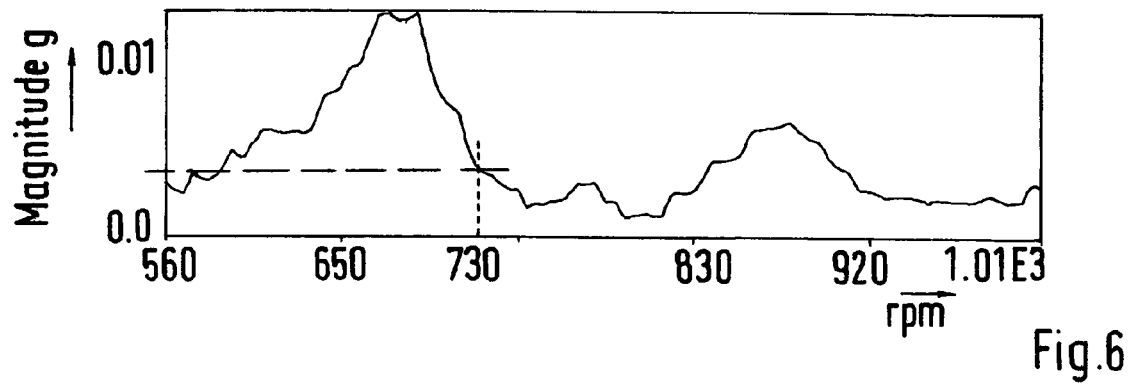

In the diagrams of FIGS. 5 and 6, the displacement or lowering of the yaw vibrations of the motor 2 are shown, for example, at 720 rpm to a value of originally more than 16 mg to significantly below the value of 4 mg, so that the device 14 provides for a significantly improved vibrational behavior at idle speed of the motor or the drive assembly 2.

To summarize certain features of the invention, the articulated column 20 includes a triangle-shaped carrier segment having, at free ends of its brackets 23, 24, the holding devices 25, 26 for the exhaust pipes. A mount for the horizontally arranged swiveling axis X-X is disposed in an upper area where the two brackets 23, 24 meet.

The articulated column 20 may be seated at a load bearing structure 15, which is connected with a transverse carrier bracing 11 of the internal combustion engine 2 supported on vehicle structure.

The holding devices 25, 26 for the exhaust pipes 7, 4 can be arranged coaxially to each other at a distance from the articulated column 20.

The exhaust pipes 4, 7 of the exhaust pipe systems I, II, which are encompassed by the holding devices 25, 26 of the articulated column 20, can enter into a lower area of a pan T of each exhaust muffler. Each exhaust muffler may extend from an entry area of the exhaust pipes vertically upward and can have a center of gravity S arranged above the holding devices 25, 26.

The internal combustion engine 2, or the drive assembly as a whole, additionally may be seated in mounts such that it can oscillate about a vertical axis P at idle speed. The articulated column 20 can oscillate in a direction opposite to the oscillating motion of the drive assembly or the internal combustion engine 2 about the horizontally arranged swiveling axis X-X, and the exhaust muffler 8, 5 may be pivotable to counteract the oscillating motion of the drive assembly or the internal combustion engine 2 about the vertical axis P at idle speed.

Finally, the articulated column 20 may be coupled with the drive assembly or the internal combustion engine 2 pivotable in a de-coupled state about the horizontally arranged swiveling axis X-X. The column is movable about the vertical axis P such that the exhaust pipes of two exhaust pipe systems I, II, which are connected with the articulated column via the holding devices 25, 26, oppose a movement acting on two exhaust mufflers 5, 8 as well as on catalytic converters 3, 6 against oscillating motions of the drive assembly or the internal combustion engine 2 at idle speed.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

We claim:

1. A device for coupled attachment of an exhaust system to an internal combustion engine or a drive assembly for improving the vibrational behavior at idle speed, the exhaust system having an exhaust pipe system connected with each cylinder side of the motor with a catalytic converter and an upstream exhaust muffler, comprising an articulated column held in a transverse plane of the vehicle coupled with a front side of the internal combustion engine about a horizontally arranged swiveling axis aligned in a longitudinal vehicle direction, the articulated column including, at opposite diverging brackets, mutually spaced holding devices for exhaust pipes of the exhaust system, wherein each of the holding devices is arranged in an exhaust pipe system between the exhaust muffler and the catalytic converter, and wherein the exhaust muffler is connected with the internal combustion engine by way of at least one holding device.

2. The device according to claim 1, wherein the articulated column comprises a triangle-shaped carrier segment having, at free ends of its brackets, the holding devices for the exhaust pipes, and wherein, in an upper area where the two brackets meet, a mount for the horizontally arranged swiveling axis is disposed.

3. The device according to claim 1, wherein the articulated column is seated at a load bearing structure, which is connected with a transverse carrier bracing of the internal combustion engine supported on vehicle structure.

4. The device according to claim 1, wherein the holding devices for the exhaust pipes are arranged coaxially to each other at a distance from the articulated column.

5. The device according to claim 1, wherein the exhaust pipes of the exhaust pipe systems, which are encompassed by the holding devices of the articulated column, enter into a lower area of a pan of each exhaust muffler, and wherein each exhaust muffler extends from an entry area of the exhaust pipes vertically upward and has a center of gravity arranged above the holding devices.

6. The device according to claim 1, wherein the internal combustion engine, or the drive assembly as a whole, is seated in mounts such that it can oscillate about a vertical axis at idle speed, wherein the articulated column can oscillate in a direction opposite to the oscillating motion of the drive assembly or the internal combustion engine about the horizontally arranged swiveling axis, and wherein the exhaust muffler is pivotable to counteract the oscillating motion of the drive assembly or the internal combustion engine about the vertical axis at idle speed.

7. The device according to claim 6, wherein the articulated column is coupled with the drive assembly or the internal combustion engine pivotable in a de-coupled state about the horizontally arranged swiveling axis, and movable about the vertical axis such that the exhaust pipes of two exhaust pipe systems, which are connected with the articulated column via the holding devices, oppose a movement acting on two exhaust mufflers as well as on catalytic converters against oscillating motions of the drive assembly or the internal combustion engine at idle speed.

8. The device according to claim 2, wherein the articulated column is seated at a load bearing structure, which is connected with a transverse carrier bracing of the internal combustion engine supported on vehicle structure.

9. The device according to claim 2, wherein the holding devices for the exhaust pipes are arranged coaxially to each other at a distance from the articulated column.

10. The device according to claim 3, wherein the holding devices for the exhaust pipes are arranged coaxially to each other at a distance from the articulated column.

11. The device according to claim 2, wherein the exhaust pipes of the exhaust pipe systems, which are encompassed by the holding devices of the articulated column, enter into a lower area of a pan of each exhaust muffler, and wherein each exhaust muffler extends from an entry area of the exhaust pipes vertically upward and has a center of gravity arranged above the holding devices.

12. The device according to claim 3, wherein the exhaust pipes of the exhaust pipe systems, which are encompassed by the holding devices of the articulated column, enter into a lower area of a pan of each exhaust muffler, and wherein each exhaust muffler extends from an entry area of the exhaust pipes vertically upward and has a center of gravity arranged above the holding devices.

13. The device according to claim 4, wherein the exhaust pipes of the exhaust pipe systems, which are encompassed by the holding devices of the articulated column, enter into a lower area of a pan of each exhaust muffler, and wherein each exhaust muffler extends from an entry area of the exhaust pipes vertically upward and has a center of gravity arranged above the holding devices.

14. The device according to claim 2, wherein the internal combustion engine, or the drive assembly as a whole, is seated in mounts such that it can oscillate about a vertical axis at idle speed, wherein the articulated column can oscillate in a direction opposite to the oscillating motion of the drive assembly or the internal combustion engine about the horizontally arranged swiveling axis, and wherein the exhaust muffler is pivotable to counteract the oscillating motion of the drive assembly or the internal combustion engine about the vertical axis at idle speed.

15. The device according to claim 3, wherein the internal combustion engine, or the drive assembly as a whole, is seated in mounts such that it can oscillate about a vertical axis at idle speed, wherein the articulated column can oscillate in a direction opposite to the oscillating motion of the drive assembly or the internal combustion engine about the horizontally arranged swiveling axis, and wherein the exhaust muffler is pivotable to counteract the oscillating motion of the drive assembly or the internal combustion engine about the vertical axis at idle speed.

16. The device according to claim 4, wherein the internal combustion engine, or the drive assembly as a whole, is seated in mounts such that it can oscillate about a vertical axis at idle speed, wherein the articulated column can oscillate in a direction opposite to the oscillating motion of the drive assembly or the internal combustion engine about the horizontally arranged swiveling axis, and wherein the exhaust muffler is pivotable to counteract the oscillating motion of the drive assembly or the internal combustion engine about the vertical axis at idle speed.

17. The device according to claim 5, wherein the internal combustion engine, or the drive assembly as a whole, is seated in mounts such that it can oscillate about a vertical axis at idle speed, wherein the articulated column can oscillate in a direction opposite to the oscillating motion of the drive assembly or the internal combustion engine about the horizontally arranged swiveling axis, and wherein the exhaust muffler is pivotable to counteract the oscillating motion of the drive assembly or the internal combustion engine about the vertical axis at idle speed.

18. The device according to claim 14, wherein the articulated column is coupled with the drive assembly or the internal combustion engine pivotable in a de-coupled state about the horizontally arranged swiveling axis, and movable about the vertical axis such that the exhaust pipes of two exhaust pipe systems, which are connected with the articulated column via the holding devices, oppose a movement acting on two exhaust mufflers as well as on catalytic converters against oscillating motions of the drive assembly or the internal combustion engine at idle speed.

19. The device according to claim 15, wherein the articulated column is coupled with the drive assembly or the internal combustion engine pivotable in a de-coupled state about the horizontally arranged swiveling axis, and movable about the vertical axis such that the exhaust pipes of two exhaust pipe systems, which are connected with the articulated column via the holding devices, oppose a movement acting on two exhaust mufflers as well as on catalytic converters against oscillating motions of the drive assembly or the internal combustion engine at idle speed.

20. The device according to claim 16, wherein the articulated column is coupled with the drive assembly or the internal combustion engine pivotable in a de-coupled state about the horizontally arranged swiveling axis, and movable about the vertical axis such that the exhaust pipes of two exhaust pipe systems, which are connected with the articulated column via the holding devices, oppose a movement acting on two exhaust mufflers as well as on catalytic converters against oscillating motions of the drive assembly or the internal combustion engine at idle speed.

* * * * *